United States Patent [19]

McNatt et al.

[11] Patent Number: 4,725,992
[45] Date of Patent: Feb. 16, 1988

[54] ADAPTIVE SEISMOMETER GROUP RECORDER HAVING ENHANCED OPERATING CAPABILITIES

[75] Inventors: Michael S. McNatt, Bixby; Henry J. McKinley, Jr., Tulsa; Sampat M. Rampuria, Tulsa, all of Okla.; Ralph E. Warmack, Houston, Tex.

[73] Assignee: Amoco Corporation, Chicago, Ill.

[21] Appl. No.: 804,404

[22] Filed: Dec. 3, 1985

[51] Int. Cl.$^4$ ............................ G01V 1/22; H04B 7/14
[52] U.S. Cl. ...................................... 367/77; 364/421; 367/63
[58] Field of Search ............................ 367/76, 77, 63; 364/421

[56] References Cited

U.S. PATENT DOCUMENTS

| | | | |
|---|---|---|---|
| 3,283,295 | 11/1966 | Mongtomery | 367/77 |
| 3,806,864 | 4/1974 | Broding et al. | 367/77 |
| 3,946,357 | 3/1976 | Weinstein et al. | 367/77 |
| 4,017,833 | 4/1977 | Broding | 367/77 |
| 4,561,074 | 12/1985 | Warmack | 364/421 |
| 4,561,075 | 12/1985 | Smith et al. | 364/421 |
| 4,604,699 | 8/1986 | Borcherdt et al. | 364/421 |

Primary Examiner—Thomas H. Tarcza
Assistant Examiner—Ian J. Lobo
Attorney, Agent, or Firm—Timothy D. Stanley

[57] ABSTRACT

In a seismic exploration system, an adaptive seismometer group recorder having enhanced operating capabilities for acquiring, processing, and storing seismic signals is provided. The adaptive seismometer group recorder includes a solid state memory, a microprocessor and input means for electronically downloading operating programs into the solid state memory whereby menus of recorder operating parameter are provided by the operating programs to the microprocessor to electronically reconfigure the SGR for various geological settings. The microprocessor is responsive to coded signals for selecting sets of recorder operating parameters from the menu of recorder operating parameters provided by the operating programs. The electronically downloaded menus of recorder operating parameters digitally reconfigure the operating characteristics of the seismometer group recorder without necessitating the implementation of hard wired circuitry changes.

25 Claims, 4 Drawing Figures

ADAPTIVE SEISMOMETER GROUP RECORDER HAVING ENHANCED OPERATING CAPABILITIES

BACKGROUND OF THE INVENTION

This invention relates generally to geophysical exploration. More particularly, this invention is directed to a seismic exploration system including an adaptive seismometer group recorder having enhanced operating capabilities for acquiring, processing, and storing seismic signals.

Seismic exploration involves generating seismic waves at the surface of the earth by means of a seismic source. The seismic waves travel downwardly into the earth and are reflected and/or refracted due to differences in the elastic impedance at the interface of various subterranean formations. Detectors, called seismometers. or geophones, located along the surface of the earth, and/or in a borehole produce analog electric seismic signals in response to detected seismic wave reflections and/or refractions. The analog electric seismic signals from the seismometers, or geophones, can then be recorded. Alternatively, the analog electric seismic signals from the seismomters, or geophones, can be sampled and digitized prior to being recorded. The seismic data recorded in either manner are subsequently processed and analyzed to determine the nature and structure of the subterranean formations.

Various portable seismic exploration systems are known. One type of portable seismic exploration system employs cableless seismic recording systems developed for semismic prospecting by digitally recording seismic signals produced by seismometers or geophones without the need for multiconductor cables or alternate means such as radio or wire telemetry for transmitting seismic data to a central recording point. In particular, the cableless seismic recording system includes recorders placed near the seismometer, or geophone, locations and arranged for producing individual recordings in response to control signals transmitted from a control point over a communication point, preferably a radio communication link. A second type of portable seismic exploration system employs various telemetry systems, which merely relay the acquired seismic data by way of a radio communications link, or a fiber optic or electric cable, to a central recording location.

The forerunner of cableless seismic recording system disclosed by Montgomery U.S. Pat. No. 3,283,295 comprises a cableless seismic analog recording system wherein a radio receiver is associated with a recorder located at each seismometer, or geophone, location in the prospect area. The recorder is activated by control signals from a centrally located radio transmitter and thereafter records the analog seismic data. However, the cableless seismic analog recording system disclosed in Montgomery is limited to an analog recording of a seismic signal as a frequency modulated magnetic record which is inferior to digital recording, which has unexcelled accuracy, dynamic range, and freedom from noise interference. Additionally, Montgomery discloses that all remotely operated recorders are in operation for each recording. Reconfiguration of the array for each new recording involves repositioning the various recorders along the line of survey.

Broding, et al., U.S. Pat. No. 3,806,864, hereby incorporated by reference into this specification to form a part thereof, discloses a cableless seismic recording system which overcomes the two noted deficiencies of the cableless seismic analog recording system disclosed by Montgomery in that the recording produced is digital in format and out of a large array of recorders remotely deployed in one prospect area, only those recorders needed for producing a given set of recordings are selectably activated and caused to record seismic data. The remaining recorders remain essentially quiescent until there is a desire to produce a set of recordings for the prospect areas where they are situated. As disclosed in Broding, the seismic data are recorded on a magnetic tape cartridge. The recorded seismic data are filtered, amplified and digitized in accordance with a fixed menu provided by hard-wired circuitry of the recorder.

Many techniques for generating seismic waves are currently in use. An exploding dynamite charge is an example of a high energy seismic source which generates a sharp pulse of seismic energy. Vibrators, which generate a "chirp" signal of seismic energy and hammers are examples of low energy surface seismic sources. In the case of vibrators, the recorded seismic wave reflections and/or refractions are cross-correlated with a replica (called the pilot signal) of the original chirp signal in order to produce recordings similar to those which would have been produced with a high energy seismic source. This process is commonly referred to by its tradename, VIBROSEIS.

Unfortunately, the recorded seismic data always include some background noise in addition to the detected seismic waves reflected and/or refracted from the subsurface formation (referred to as a seismic signal). The ambient noise appears in many forms, such as atmospheric electromagnetic disturbances, wind, motor vehicle traffic in the vicinity of the prospect area, recorder electrical noise, etc. When a high energy seismic source is used, such as dynamite, the level of detected seismic signal is usually much greater than ambient noise.

The use of the cableless seismic recording system disclosed by Broding, et al., is most advantageous in instances when seismic data is generated by a high energy seismic source. However, when a low energy surface seismic source is used, such as a vibrator used in Vibroseis type seismic prospecting, the ambient noise can be at a level greater than the seismic signal. For that reason, Vibroseis-type seismic records are often produced from the repeated initiation of the low energy surface seismic source at about the same origination point, thereby producing a sequence of seismic data based on the seismic wave reflections and/or refractions that have traveled over essentially the same path and, therefore, have approximately the same travel times. Because the data storage capacity in commercially available, magnetic tape cartridges such as disclosed by Broding, et al., is limited, the capacity is not always adequate for recording every repetition individually, or accommodating the increased record length required when the low energy seismic source is used.

In order to lessen the impact of the limited data storage capacity of commercially available magnetic tape cartridges, seismic data generated by low energy seismic sources can be vertically stacked (summed or composited) prior to recording in order to economize tape usage. Weinstein, et al., U.S. Pat. No. 3,946,357 and Broding, U.S. Pat. No. 4,017,833 both disclose hard-wired digital circuitry in the recorder of a cableless seismic recording system for summing seismic data acquired by the recorder in accordance with a fixed menu.

Weinstein, et al., U.S. Pat. No. 3,946,357, discusses a recorder including an adder circuit which sums newly acquired seismic-trace data received from a shift register with previously accumulated seismic-trace data temporarily stored in random access memory between consecutive initiations of the seismic source, and the accumulated sum is later recorded on a magnetic tape cartridge. Broding U.S. Pat. No. 4,017,833 discloses a recorder including a plurality of recirculating dynamic shift registers connected in cascade for storing the accumulated sum between consecutive initiations of the seismic source in order to economize power consumption.

In spite of such developments, a need remains in the field of geophysical exploration for acquiring, processing and storing seismic data with a portable seismometer group recorder having means for electronically downloading operating programs providing a plurality of menus of recorder operating parameters into the portable seismometer group recorder. Electronically downloading operating programs into the seismometer group recorder provides an operator with a plurality of menus of recorder operating parameters to remotely select from such that the portable seismometer group recorder can be remotely, electronically reconfigured to acquire and process seismic data for various geological settings without the necessity or expense of making hard-wired modifications to or replacements of the circuitry of such portable seismometer group recorders. Additionally, a need exists to provide the portable seismometer group recorder with means responsive to coded signals, transmitted from a remote control unit, for selecting recorder operating parameters from a menu of recording operating parameters to electronically reconfigure the portable seismometer group recorder to process the acquired seismic data for different geological settings without having to physically retrieve the portable seismometer group recorder. The present invention comprises an adaptive seismometer group recorder and method of geophysical exploration directed to fulfilling such needs.

SUMMARY OF THE INVENTION

In a seismic exploration system, an adaptive seismometer group recorder (SGR) having enhanced operating capabilities for acquiring, processing and storing seismic signals is provided. The adaptive SGR of the present invention includes a solid state memory and input means for electronically downloading a plurality of operating programs, which provide menus of recorder operating parameters, into the solid state memory of the SGR. The adaptive SGR also includes processing means responsive to coded signals for selecting sets of recorder operating parameters, to acquire, process and store seismic signals for different geological settings, from the menus of recorder operating parameters provided by the operating programs resident in the solid state memory. With the electronically downloaded operating programs, the SGR can be electronically reconfigured by the processing means in response to transmitted coded signals from a remote point to acquire, process and store seismic data for a plurality of different geological settings, as well as test the seismometer group recorder and geophones attached thereto.

In a preferred embodiment of the present invention, a high-speed data transceiver is provided with the SGR for electronically downloading operating programs into the solid state memory of the SGR. The solid state memory of the SGR is electronically programmable, and can be either volatile or nonvolatile solid state memory. The operating programs electronically downloaded into the solid state memory can provide menus of recorder operating parameters for acquiring and processing seismic data for different geological settings such as: a plurality of seismic signal low-cut filtering frequencies; a plurality of seismic signal sampling rates; a plurality of weighting and stacking algorithms; a plurality of seismic signal gain settings; an option for inserting a temperature compensated notch filter or an automatic notch filter; as well as a plurality of SGR diagnostic instructions.

The SGR also includes a microprocessor responsive to coded signals transmitted from a remote point for selecting sets of recorder operating parameters from the menus of recorder operating parameters provided by the operating programs so as to electronically reconfigure the SGR for a plurality of different geological settings without the need to either physically retrieve the the SGR and/or effect hard-wired changes thereto. The ability to electronically download additional menus of recorder operating parameters to electronically reconfigure the SGR for different geological settings is highly desirable. Weinstein, et al., and Broding both provide a single, fixed menu of recorder operating parameters resident in either read only memory or hard-wired digital logic circuits and changes thereto require modifying the existing hard-wired digital circuitry or the addition of separate components connectable to the existing hard-wired digital circuitry of the SGR. Unlike known portable SGR units, the adaptive SGR of the present invention provides enhanced operating capabilities without having to physically alter onboard circuits to reconfigure its recorder operating parameters or to physically retrieve the SGR units.

The electronically programmable solid state memory includes a magnetic bubble memory subsystem or a high capacity, battery backed-up CMOS DRAM which are employed to electronically store both acquired seismic data as well as menus of recorder operating parameters provided by the operating programs. The use of magnetic bubble memory or CMOS DRAM components in the solid state memory system is highly desirable because of their nonvolatile character or their ability to affect nonvolatile characteristics respectively and their resistance to environmental stresses such as extreme temperatures, humidity, shock and vibration. The nonvolatile character of the magnetic bubble memory components also provides a method for regulating the generally high power consumption requirements of the magnetic bubble memory subsystem so as to conserve the energy capacity of the SGR power supply. The use of magnetic bubble memory components with limited power capacity systems, such as the portable SGR of the present invention, would generally have been precluded but for limiting the magnetic bubble memory components energy consumption. By activating the magnetic bubble memory subsystem only when predetermined quantities of seismic data are available for transfer from a volatile random access buffer memory to the bubble memory system or to electronically download additional operating programs, the energy consumption of the magnetic bubble memory subsystem can be limited. Alternatively, high capacity, battery backed-up CMOS DRAM can be employed since it consumes very little power to affect nonvolatile characteristics.

The use of a solid state memory subsystem for the storage of seismic data generally eliminates the need for moving parts associated with magnetic tape cartridge recording systems of the type employed by other cableless seismic recorders and thus enhances the adaptive SGR's reliability. Unlike previous portable seismic recorders employing magnetic tape cartridges, the need to physically remove the magnetic tape cartridge for transcription and further processing of the seismic data can be eliminated. As such, the adaptive SGR can now be packaged in a sealed container to protect its various electronic components from the generally harsh operating environments.

Further, the various operating programs resident in the magnetic bubble memory subsystem or CMOS DRAM solid state memory can be electronically transferred into low power consumption, volatile, solid state operating memory which can be employed by the microprocessor to electronically reconfigure the adaptive SGR. Other advantages of the adaptive SGR of the present invention will be evident from the figures and the description of a preferred embodiment.

DESCRIPTION OF A PREFERRED EMBODIMENT

In accordance with the present invention, an adaptive SGR having enhanced operating capabilities for acquiring, processing, and storing seismic data is provided in a seismic exploration system. The seismic exploration system includes a plurality of portable adaptive SGR's spaced about a prospect area in predetermined locations each having at least one string of seismometers or geophones connected thereto for acquiring seismic data. Each adaptive SGR is responsive to coded signals transmitted from a remote control unit for remotely, electronically reconfiguring the recorder operating parameters of the SGR to acquire, process and store seismic data for different geological settings.

Prior to deploying the adaptive SGR's of the present invention in the field, operating programs providing menus of recorder operating parameters for the adaptive SGR are electronically downloaded into each adaptive SGR such that coded signals transmitted from a remote control unit and acted upon by the adaptive SGR can be employed to electronically reconfigure the adaptive SGR to acquire, process and store seismic data for various geological settings. Additionally, each SGR is programmed to respond initially only to coded signals which include its unique individual serial identification code. Initially, after the adaptive SGR's are deployed, a first coded signal, labeled a program call, is transmitted by the remote control unit to each adaptive SGR to assign recorder header data including a field location identifier and to select an initial set of recorder operating parameters from a menu of recorder operating parameters provided by the operating programs resident each adaptive SGR. A variation of the program call, labeled a program change call, can be made between acquisition cycles to affect changes in the seismic data acquisition and processing parameters without having to physically retrieve the adaptive SGR so as to modify or replace its electronic circuitry. A second coded signal, labeled a test call, is then transmitted to each adaptive SGR to verify the field location identifier assignment as well as to initiate a series of self-diagnostic tests to verify the functionality of each adaptive SGR. The sequence of program call and test call is then repeated for all other adaptive SGR's in the seismic exploration system.

With the adaptive SGR's programmed and tested, a third series of coded signals, labeled acquisition calls, are transmitted to selectably activate predetermined adaptive SGR's to collect seismic data. The acquisition call includes a zero-time mark for the simultaneous initiation of seismic data collection by each adaptive seismic recorder in operation. The activated adaptive SGR automatically deactivates after a prescribed time period. The acquisition call can also initiate the firing of a dynamite charge or the synchronized starting of vibrators. The seismic data acquired and processed, in real time by each adaptive SGR, are initially stored in a volatile buffer memory and after a predetermined amount of seismic data has been so collected, the processed seismic data are electronically transferred to a solid state memory, preferably magnetic bubble memory subsystem. Alternatively, high capacity, battery backed-up CMOS DRAM can be employed since it consumes very little power to affect nonvolatile characteristics. The various coded signals received by the adaptive SGR will be more fully discussed below.

Typically, after a day's worth of seismic exploration, the adaptive SGR's are gathered up and returned to a battery charging/seismic data transcriber truck. Here, employing the adaptive SGR's high speed data transceiver or link in conjunction with the solid state memory, the seismic data stored therein can be electronically transferred from the adaptive SGR to the transcriber truck for transcription into a format suitable for further processing by a large central processing unit. The solid state memory, which in the preferred embodiment includes magnetic bubble memory subsystem, has a capacity approximating a typical days' worth of vibroseis-type seismic data. Since the seismic data are stored in solid state memory, the adaptive SGR electrical components can be housed in a sealed container to insulate them from harsh operating environments. Additionally, the high speed data transceiver or link can be employed to electronically download new operating programs providing new menus of recorder operating parameters into the magnetic bubble memory subsystem without having to open the adaptive SGR container to replace or modify existing hard-wired electronic circuitry to affect changes in the operating characteristics of the adaptive SGR.

A detachable connector cable couples the high speed data transceiver of the adaptive SGR to the transcriber truck to permit the communication of operating programs to the adaptive SGR and the communication of seismic data to the transcriber truck. A separate detachable cable couples a power supply of the adaptive SGR to a battery charging system of the charging/transcriber truck to recharge the power supply. The menus of recorder operating parameters provided by the operating programs resident in the solid state memory system can be transferred to a microprocessor operating memory of the SGR each time the adaptive SGR is activated or if the operating programs within the operating memory are determined to be in error by the microprocessor.

Figure 1:
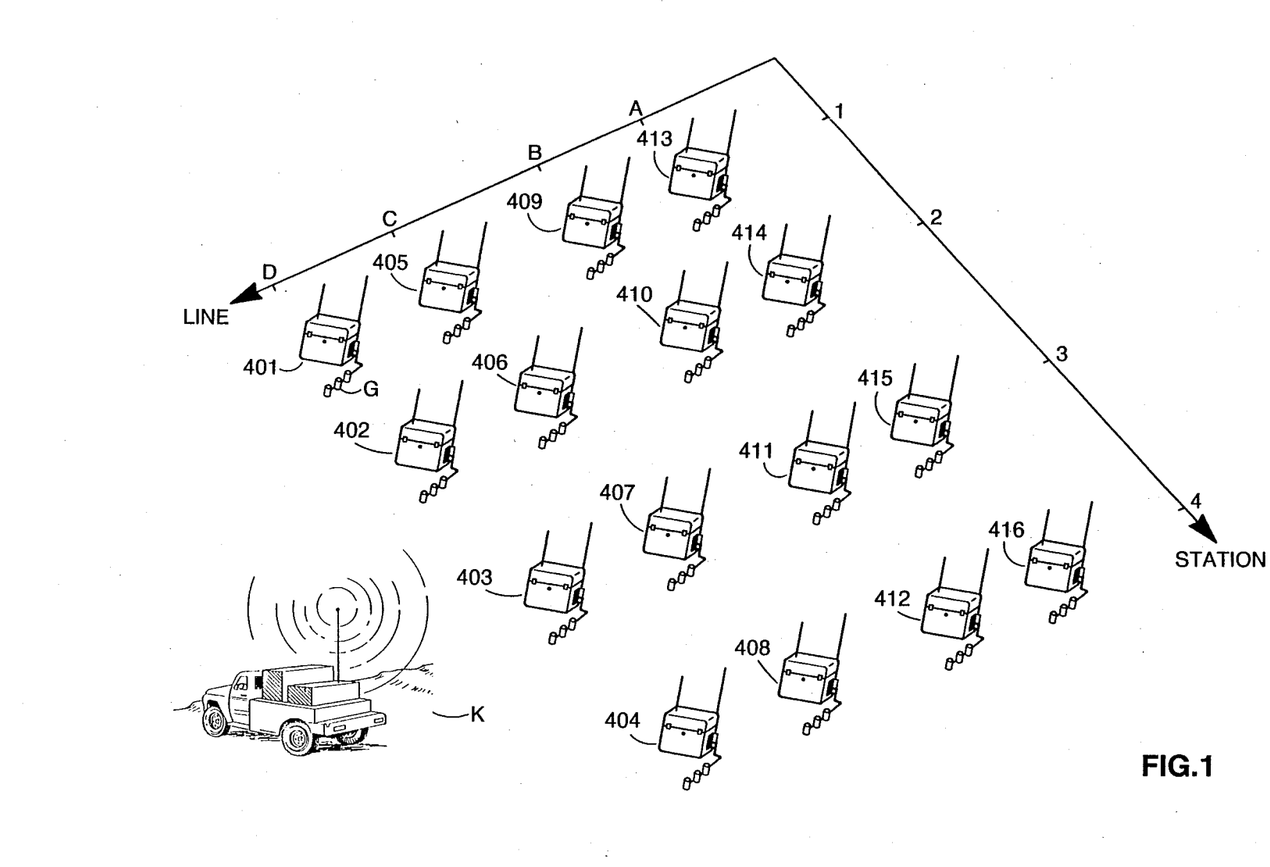
FIG. 1 is a diagrammatic layout of the seismic exploration system including adaptive SGR.

Referring now to FIG. 1, a seismic exploration system is shown diagrammatically. Operationally, the adaptive SGR of the present invention has enhanced operating characteristics for acquiring, processing, and storing seismic data not previously provided. Specifically, the adaptive SGR of the present invention can be remotely programmed to electronically reconfigure its recorder operating parameters without electronic circuitry modifications or additions. The operating capabilities of the adaptive SGR can also be altered by electronically downloading a plurality of operating programs providing new menus of recorder operating parameters without employing electronic circuitry modifications or additions thereto.

As seen in FIG. 1, a plurality of adaptive SGR's (401–416) are deployed a prospect area at spaced locations. Each of the adaptive SGR's (401–416) has at least one string of geophones G connected thereto. Each adaptive SGR (401–416) has a unique individual serial identification code to which it is responsive when the individual serial identification code is transmitted over a radio frequency (RF) communications link at a preselected frequency $f_1$. An appropriate control means is needed for controlling seismic prospecting utilizing a preferred embodiment of the adaptive SGR of the present invention. The function of such control means is to transmit coded signals at preselected radio frequencies. In particular, a remote control unit K is provided to transmit a program call, including the unique individual serial identification code at the selected frequency $f_1$, so as to initially activate and program each adaptive SGR (401–416). The unique individual serial identification code is initially set by installing jumper wires within the circuitry of the SGR. A microprocessor within the SGR reads the jumper wire connections and stores this as the individual serial identification code in an operating memory to compare the individual serial identification codes transmitted by the control unit K.

Since the field locations of SGRs within the prospect areas is a matter of importance for subsequent processing of the seismic data collected by each adaptive SGR seismic recorder (401–416), a coordinate system of station and line numbers is typically employed in seismic exploration. As shown in FIG. 1, each adaptive SGR can be initially activated using its individual serial identification code and thereafter assigned a station and line field location code to which it will also respond. Each adaptive SGR (401–416) can have multiple strings of geophones G attached thereto. In one embodiment, each adaptive SGR (401–416) can have four separate input channels, each adapted to be connected to a separate string of geophones G. As such, each adaptive SGR can additionally be assigned a field location code for each channel, for example, adaptive SGR serial identification code 401 with four separate input channels will have the following field location codes: A:1:1, A:1:2, A:1:3, and A:1:4 (line number:station number:channel number). While adaptive SGR serial identification code 406 would have the following field location codes: C:2:1, C:2:2, C:2:3, and C:2:4, etc. Thereafter each adaptive SGR (401–416) will respond either to its individual serial identification code or its field location code. The twofold identification code technique permits the operator to remotely call up an adaptive SGR either by its field location code and/or its individual serial identification code with the remote control unit K. During the course of seismic exploration, it is common practice to relocate each adaptive SGR several times in particularly large prospect areas and as such, each adaptive SGR must be capable of being assigned new field location codes.

Figure 2:
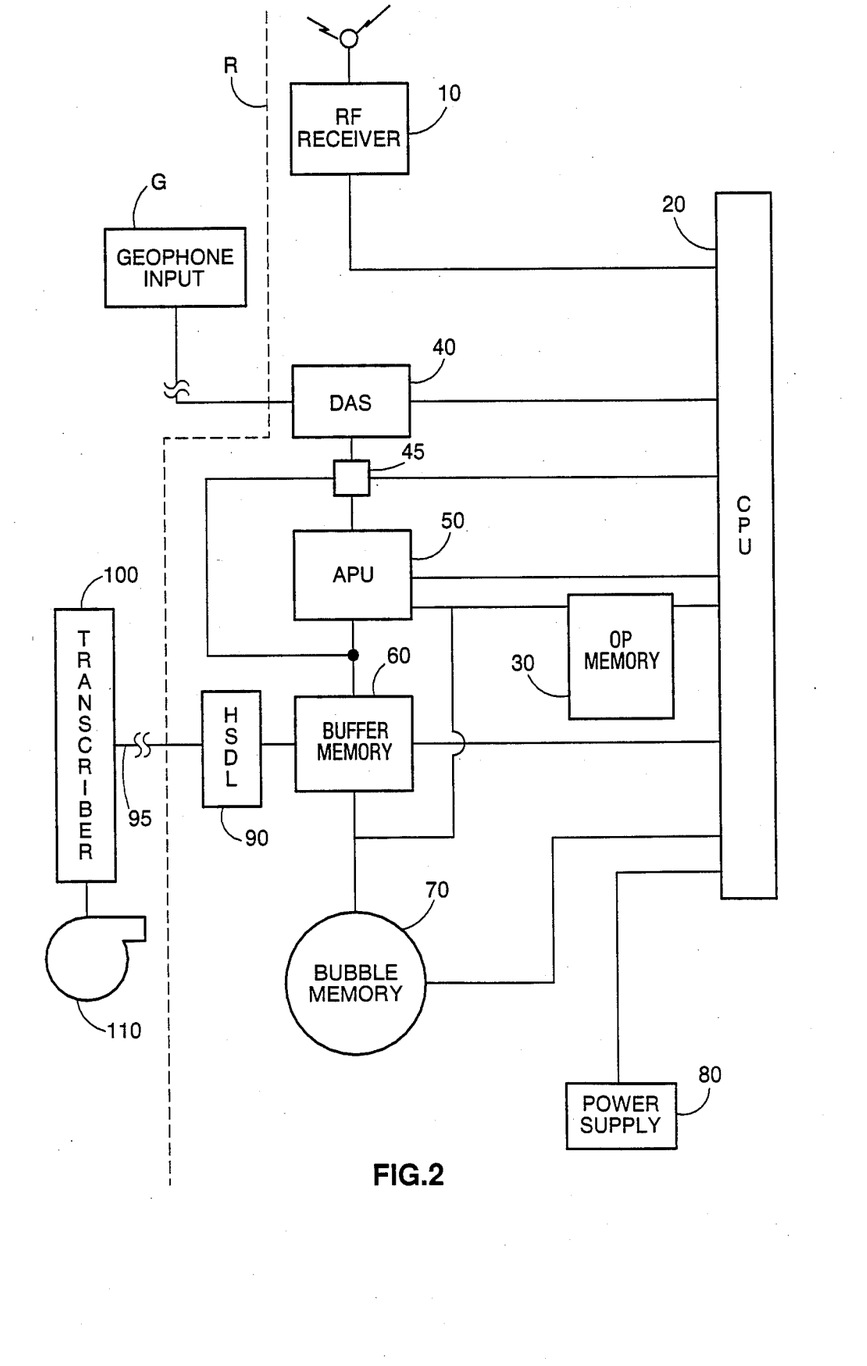
FIG. 2 is a partial schematic and partial block diagram of the electrical components of a preferred embodiment of the adaptive SGR of the present invention.

Now looking to FIG. 2, a partial schematic and partial block diagram of the electrical components of adaptive SGR R are shown to the right of the dashed line. The flow paths for seismic data, command and control signals, and electronically downloading additional operating programs with reference to the electrical components of the adaptive SGR R will be more fully discussed below.

The adaptive SGR R includes a communications link 10. In a preferred embodiment the communication link 10 can be a RF receiver using a Manchester II encoding scheme operating between 153 and 159 MHz in 5 KHz steps. The communication link 10 is adapted to receive coded signals transmitted from the remote control unit K of FIG. 1 for selecting acquisition and operating parameters from a menu of recorder operating parameters provided by operating programs and for initiating various diagnostics within the adaptive SGR. Coded signals received by the communications link 10 are communicated to and evaluated by a central processing unit 20 (CPU). The central processing unit 20 can be a microprocessor such as an NSC 800 manufactured by National Semiconductor. An operating memory 30 provides a residence for various operating software which the CPU 20 employs to evaluate the coded signals from the communications link 10 and to generate command and control signals to various electrical components of the adaptive SGR R. The operating memory 30 can of the random access memory (RAM) type. Since the operating memory 30 is RAM, it can easily be reprogrammed for new operating software or programs electronically downloaded into the adaptive SGR R, as shall be discussed below.

In response to coded signals from the control unit K, the CPU 20 can issue various command and control signals to the communications link 10, a data acquisition subsystem 40, an arithmetic processing unit 50, a buffer memory 60, a solid state magnetic bubble memory 70, a power supply 80 and a high speed data link or transceiver 90, all of which will be more fully discussed below.

In a preferred embodiment, the adaptive SGR R includes two input channels for the input of analog signals from two strings of geophones G. In particular, the geophone input is received by the data acquisition subsystem 40. As shall be discussed more fully below, the data acquisition subsystem (DAS) 40, in response to command and control signals from the CPU 20, selectably amplifies, filters and digitizes the input analog signal of the geophones G.

The amplified, filtered and digitized output signals (hereinafter seismic data) of the DAS 40 can be transmitted either to arithmetic processing unit (APU) 50 or directly to buffer memory 60. If the SGR R is employed with high energy seismic sources, such as dynamite, a portion of the coded signal transmitted from the remote control unit K directs the CPU 20 to issue a command and control signal to selector switch 45 which directs the seismic data to the buffer memory 60. In the case of low energy seismic sources, such as swept frequency vibrators, the seismic data are first directed to APU 50 to be selectably weighted and vertically stacked on a real time basis as the seismic data are collected and thence to buffer memory 60. The APU 50 selectably weights and vertically stacks the seismic data in response to coded command and control signals from the CPU 20. By way of example such weighting and stacking can be that set forth in the U.S. patent application Ser. Nos. 454,401 and 454,403 both commonly assigned to Amoco Corporation and incorporated by reference herein. Both weighting schemes have also been implemented in a seismometer group recorder as described in U.S. patent application Ser. No. 454,403 commonly assigned to Amoco Corporation and incorporated by reference herein.

The weighted and vertically stacked seismic data from the APU 50 or the seismic data from the high energy source are temporarily stored in the buffer memory 60. Buffer memory 60 can be electronically programmable dynamic RAM-type memory having 256 Kbyte storage capacity. After a predetermined amount of seismic data are collected and stored in the buffer memory 60, as monitored by the CPU 20, the CPU 20 activates the solid state magnetic bubble memory subsystem (BMS) 70 and electronically transfers the collected seismic data contained within the buffer memory 60 to the BMS 70. After completion of such transfer the CPU 20 deactivates the BMS 70. The BMS 70 is preferably nonvolatile, electronically programmable solid state memory and can include Fijitsu or Hitachi 4 Mbyte magnetic bubble memory components. Alternatively, high-capacity, battery backed-up CMOS DRAM can be employed because it can affect nonvolatile characteristics with very low power consumption. In the preferred embodiment, the BMS 70 has a total storage capacity of 8 Mbyte or 4 Mbyte per input channel; however, this storage capacity can easily be increased by the addition of more magnetic bubble memory components. The BMS 70 is also residence for all operating software or programs to be implemented in the adaptive SGR R, including: weighting and vertical stacking algorithms for use in the APU 50 and operating software and programs for the operating memory 30 as well as diagnostic instructions and general recorder operating sequences.

The adaptive SGR R also includes a high-speed data transceiver or link (HSDL) 90 which is responsive to command and control signals from the CPU 20 for electronically transferring seismic data stored in the BMS 70 to a remote transcriber 100 through a detachable cable 95, which transcribes the seismic data into a format, such as magnetic tape reels 110, suitable for further processing by a mainframe computer. The HSDL 90 also provides a communications path for electronically downloading additional operating programs, having new menus of recorder operating parameters, in the BMS 70. In the preferred embodiment, HSDL 90 comprises a data link operating at a 2 Mbit/second burst rate for communicating data encoded with a Manchester II encoding scheme. A high level data link control protocol standard is then used and the operating programs or seismic data, are communicated in messages of 1 Kbyte to 16 Kbytes in length.

The power supply 80 comprises a 12 volt system of rechargeable batteries such as D cell or C cell type. Since rechargeable batteries are employed, the power supply 80 can easily be recharged daily at the time of transcription of seismic data at the charging/transcriber truck.

Figure 3:
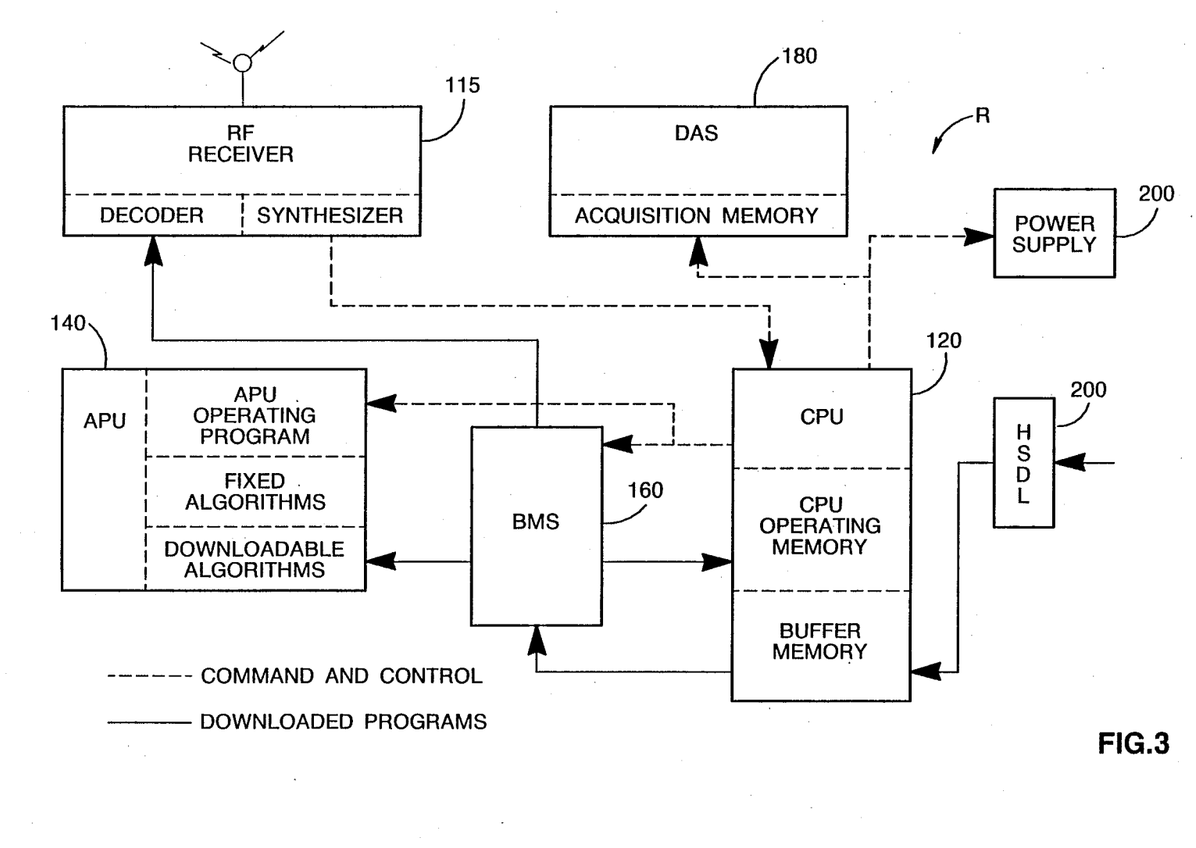
FIG. 3 is a partial schematic and partial block diagram of the electrical components of a preferred embodiment of the adaptive SGR.

With reference now to FIG. 3, a partial schematic and partial block diagram of the electrical components of the adaptive SGR R, the flow paths of the command and control signals, as well as the flow paths for electronically downloaded operating programs are shown. In response to a coded signal transmitted from the remote control unit K, the RF receiver 115 receives and communicates a command and control signal to the CPU 120. Control of all subsystems within the adaptive SGR R originates from the CPU 120. The operating software or programs residing in the CPU operating memory are executed by the CPU 120, thereby controlling all other subsystems in the adaptive SGR R.

In response to either a program change call or a program call, from the remote control unit K, as detailed in Table I, the CPU 120 directs command and control signals to the APU 140 which further evaluates such command and control signals by using its own APU operating program to select from one of the inverse power weighting (IPW) and stacking algorithms resident in memory of the APU 140 as fixed algorithms or algorithms electronically downloaded therein from the BMS 160. The CPU 120 also directs the APU 140 to select window lengths for processing the digitized seismic data from the DAS 180. Information concerning the type of seismic source used is also conveyed in such calls whereby the selector switch 45 of FIG. 2 directs the flow of seismic data from the DAS 180.

In further response to program change calls and program calls, the CPU 120 directs command and control signals to the DAS 180 whereby the sample interval or sampling rate for digitizing the analog signal from the geophone can be selected. The command and control signal from the CPU 120 to the DAS 180 can further activate a low cut filter as well as select a low cut frequency for the low cut filter of the DAS 180. An automated notch filter (generally centered on 50 Hz or 60 Hz) can be activated in the DAS 180 in response to the command and control signal. In particular, the automated notch filter is automatically switched in or out if induced power line noise in the geophone input is above or below a preset threshold level. The CPU 120 samples the input analog signal from the geophones on a preset schedule or in response to coded signals from the remote control unit K. This is generally done before commencing seismic data acquisition such that the input analog signal from the geophones largely represents induced power line signal. The CPU 120 switches in the automatic notch filter and obtains a root mean square (RMS) value of the input analog signal. Then, the CPU 120 switches the automatic notch filter out and obtains a second RMS value of the input analog signal. The CPU 120 computes the difference between the two RMS values of the input analog signal and compares such difference to a stored value in operating memory. If the difference in RMS values is less than the stored value, the CPU 120 switches the automatic notch filter out of the DAS 180; however, if the difference in RMS values is equal to or greater than the stored value, the CPU 120 switches the automatic notch filer in. Preamplifier gain and external gain for the gain-ranging amplifier of the DAS 180 can also be selected with command and control signals from the CPU 120. In the preferred embodiment, the automatic notch filter comprises three separate notch filters in parallel, each adapted for optimum efficiency over a given range of temperatures. Hence, the CPU 120 selects the notch filter having a temperature range overlapping the ambient temperature.

The CPU 120 includes a clock which periodically, e.g., once every 3 secs or once every 30 secs, initiates a power up signal to the power supply 170 whereby the RF receiver 115 can monitor for coded signals at the selected frequency which contain either the field location code or the unique individual serial identification code of a particular SGR. In response to a coded signal directed to a particular SGR, the CPU 120 directs command and control signals to the power supply 170 to activate the various other components and subsystems within the adaptive SGR. Since the CPU 120 operating memory is volatile RAM type memory, upon activation the CPU 120 transfers selected operating programs within the BMS 160 to the CPU operating memory, as directed by the coded signals. Additionally, in response to program change calls and program calls, the CPU 120 directs command and control signals to the BMS 160 whereby operating programs downloaded therein by way of the HSDL 210, can be transferred to the APU operating memory or the RF receiver decoder. New carrier frequencies from the remote control unit K, to which the RF receiver 115 and the CPU 120 will respond, can be developed from operating programs downloaded therein such that the RF receiver 115 will respond to coded signals of different carrier frequencies from the remote control unit K. This is particularly useful in areas where certain frequencies cannot be employed.

There are several different types of operating programs that can be electrically downloaded from the transcriber 100, as shown in FIG. 2, through the detachable cable 95 to the HSDL 210 in FIG. 3 and include: diagnostic programs, math weighting and stacking algorithm programs and operating system programs. All three types of operating programs follow a similar path. They are downloaded from the transcriber truck via the high-speed data transceiver 210 into the buffer memory of the CPU. The operating program changes are then loaded from the CPU buffer memory into the solid state magnetic bubble memory subsystem 160. Operating system programs resident in the BMS 160 can be transferred to the CPU operating memory upon command of the CPU 120. The diagnostic programs resident in the BMS 160 can similarly be transferred to the CPU operating memory. Note that only one of these two types of programs can be loaded into the CPU operating memory at any one time. Weighting and stacking algorithm program changes can be transferred to the APU memory from the BMS 160 upon command of the CPU 120.

Figure 4:
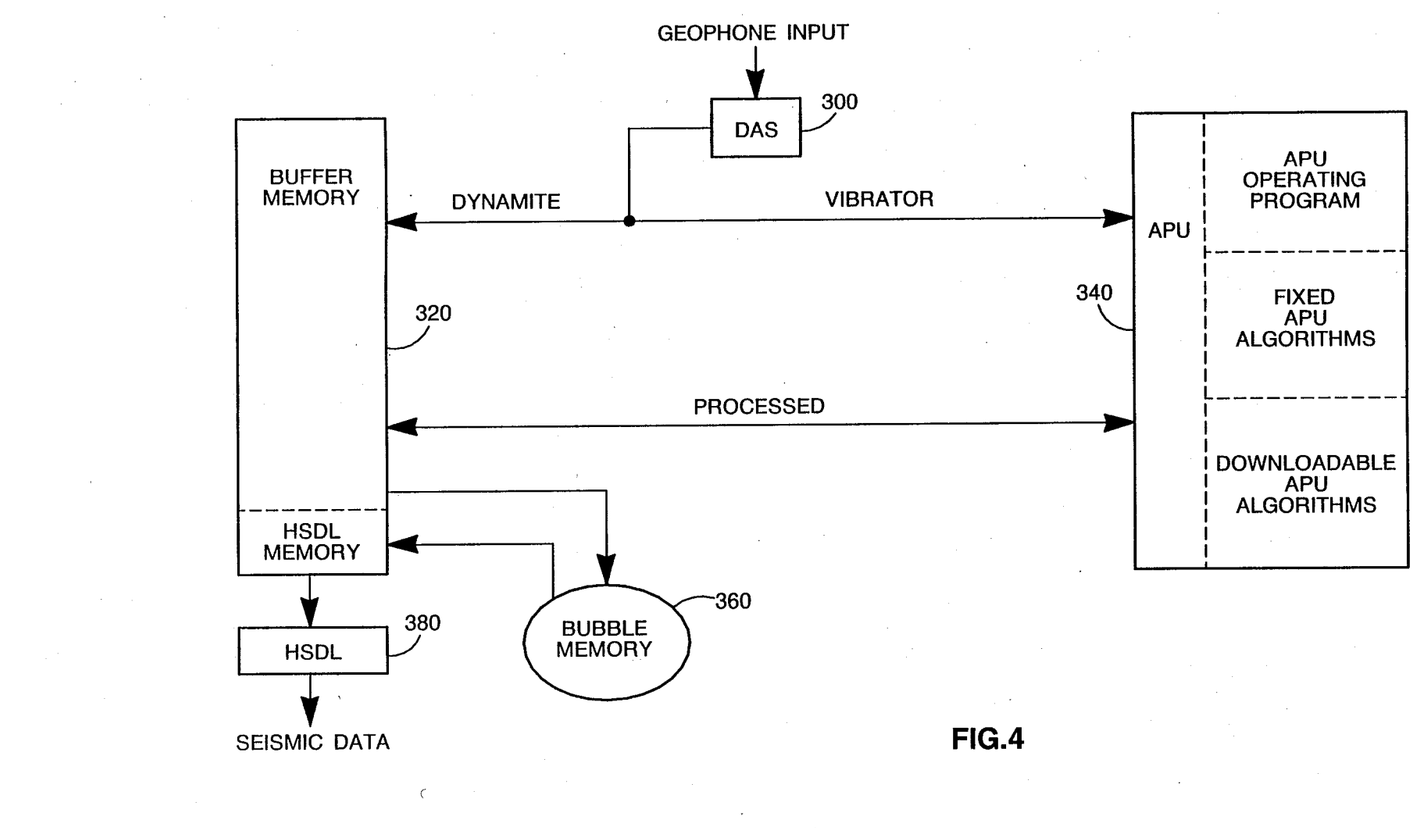
FIG. 4 is a partial schematic of partial block diagram of the electrical component of a preferred embodiment of the adaptive seismometer group recorder.

Looking next to FIG. 4, analog seismic signals generated by geophones are communicated to the data acquisition system, DAS 300. The DAS 300 filters, amplifies and digitizes the analog signals in accordance with selected recorder operating parameters and stores the seismic data either in the buffer memory 320 directly, if the seismic data are of the dynamite type or alternately, the seismic data are first routed to the APU 340 if they are of the vibrator type.

If the seismic data are of the type generated by dynamite, then one shot of dynamite will result in one signal record in the buffer memory 320. This record is subsequently sent to the data storage area of the BMS 360 after a predetermined amount of seismic data have been collected, as determined by the CPU 120. In the case of Vibroseis-type seismic data, the output of the DAS 300 is first sent to the APU 340 and then to the buffer memory 320. The buffer memory 320 also serves as a stacking memory for additional seismic data to pass from the DAS 300 to the APU 340. The APU 340 then weights and vertically stacks the seismic data from the buffer memory 320 in the form of an averaging process. As each successive set of Vibroseis-type data are input to the DAS 300, the APU 340 weights and vertically stacks each set into the buffer memory. At the end of a multiple sweep process, the seismic data in the buffer memory 320 are then sent to the data storage section of the BMS 360. During the day, seismic data input through the DAS 300 system to begin filling up the bubble memory subsystem. At the end of the day, the seismic data are retrieved from the BMS 360 over the HSDL 380, as shown in FIG. 4. Seismic data pass from the BMS 360 into the HSDL segment of the buffer memory and from the buffer memory 320 through the HSDL 380 and a detachable cable into the transcriber, as shown in FIG. 2. All of which is further described in U.S. patent application Ser. No. 525,533 commonly assigned to Amoco Corporation and incorporated by reference herein.

OPERATION

All control of the SGR systems originates from the CPU or central processing unit. The central processing unit controls all activities of the data acquisition subsystem, the radio frequency receiver, the power supply, the BMS, APU, and the high-speed data transceiver. The operating system program is stored in the CPU operating memory and is executed by the CPU, thereby controlling all other subsystems of the adaptive seismometer group recorder.

Since there are several ways in which the CPU operating memory may be altered or destroyed, including: (1) contact with a high voltage electric fence, (2) nearby lightening strikes or (3) nearby contact of high voltage cross-country wires, a portion of the operating memory also includes nonvolatile permanent memory, such as EPROM. In this permanent memory, there exists a software program which periodically determines if any errors exist in the operating program resident in the operating memory. If any errors are detected, then a new version or a replacement version of that operating program is electronically downloaded from the bubble memory subsystem into the operating memory by the CPU. The EPROM also contains its own check sum program to verify proper operation of the EPROM.

Six types of RF coded signals are received by the adaptive SGR. The six coded signals include program call, short program call, program change call, acquisition call, reset call and test call.

The general sequence of these calls is as follows:
1. Issue a Program Call to an individual SGR to (a) assign line/station numbers to each recording channel and (b) select acquisition parameters, or issue a global program call to all SGR's simultaneously omitting the line, station numbers,
2. Issue a Test Call to an individual SGR to verify the line/station number assignment and run internal diagnostic-tests or issues a continuous line/station and test call to each recorder in the line, 3. Repeat steps (1) and (2) for all the SGR's set up for the day's data collection operations, and
4. Issue a series of Acquisition Calls to large groups of SGR's to collect seismic data.

CODED SIGNALS

The purpose of the Program Call, Short Program Call and Program Change Call is to set up the SGR for data acquisition. Operating parameter information is entered into the control unit K, then transmitted to each SGR via the RF communications link. The various recorder operating parameters to be selected and header data assigned to each adapted SGR are shown in Table I below.

The Program Call is the primary acquisition parameter setup call used in day-to-day field operations. It is directed to a single SGR via its unique serial identification code, and assigns a line/station number to each acquisition channel to be used. The Program Call can also be used to change the recorder acquisition parameters for large groups of SGR simultaneously. The Short Program Call is used to reassign line/station numbers to a single SGR, without changing any of the recorder acquisition parameters previously assigned such as when the SGR is relocated. An overnight mode may be commanded as part of a Program Call or a Program Change Call from the remote control unit K. The overnight command causes the SGR to go into a very low-power mode whereby it powers up only once every 30 seconds to check for the presence of an RF call. In normal operation, the SGR powers up once every 3 seconds instead of once every 30 seconds, hence saving power. This enables SGR's which are in field operation to be "put to sleep" at the end of the day (or over lunch, etc.) and "awakened" the next morning. This, of course, assumes that sufficient battery capacity remains within the power supply for the extra day's operation.

TABLE I
PROGRAM CALL TYPES

| Short Program Call | Program Change Call | Program Call | Contents |
|---|---|---|---|
| | | | Header Data |
| | * | | No. of Call sequences |
| | * | | 1st Sequence - Start Line/Station No. |
| | * | | 1st Sequence - Stop Line/Station No. |
| | * | | 2nd Sequence |
| | . | | . |
| | . | | . |
| | * | | Last Sequence |
| * | | * | SGR serial no. (16 bit binary), up to 65,000 boxes |
| * | | * | No. channels (1, 2, 3 or 4) |
| * | | * | Record length - 3 digits, 99.9 seconds max. |
| | | | Line/Station Parameters |
| * | | * | Ch 1 line no. |
| * | | * | Ch 1 station no. |
| * | | * | Ch 2 line no. |
| * | | * | Ch 2 station no. |
| * | | * | Ch 3 line no. |
| * | | * | Ch 3 station no. |
| * | | * | Ch 4 line no. |
| * | | * | Ch 4 station no. |
| | * | * | Date of Recording 6 digits; 2 digit year (e.g., 84) and 3 digit Julian day (e.g., 276), |
| | * | * | Set or clear overnight mode |
| | | | DAS Modes |

TABLE I-continued
PROGRAM CALL TYPES

| Short Program Call | Program Change Call | Program Call | Contents |
|---|---|---|---|
| | * | * | Sample Interval (.5, 1, 2 or 4 msec) |
| | * | * | Mode Control (one of the following): Autonomous Set (normal or internal), or External Gain Set (forced), or Continuity Test, or Leakage Test, or Levitate Test, or ADC Test. |
| | * | * | Low Cut Filters (in or out), |
| | * | * | Low Cut Frequency, (8,12,18 or 27 Hz) |
| | * | * | Notch Filters (in or out) |
| | * | * | External Gain Codes, (x1, x4, x16, x64, x256, x1024, x4096, or x16384) |
| | * | * | Preamp Gain, (x8, x32, x128 or x512) |
| | | | APU Modes |
| | | | Math Configuration (same for all channels) |
| | * | * | Window length "n" value (64, 128, 256 or 512 samples per window) |
| | * | * | Math control Information: IPW algorithm "n" value (0 to 31) Source Type Code (dynamite or vibrator) |

The purpose of the Acquisition Call is to cause specified groups of adaptive SGR's to commence data acquisition. The two types of Acquisition Calls are the dynamite type and the vibrator type, depending on the source of energy. The Acquisition Call can also specify one or more adaptive SGR's as Source Units, and controls either the firing of dynamic charges or the synchronized starting of vibrators. The content of each acquisition call is shown in Table II.

TABLE II

SGR Call Sequence
    No. of call sequences
        First sequence - start line/station no.
        First sequence - stop line/station no.
            Second sequence
        .
        .
    Last sequence
Source Unit Information:
    No. of source units (max = 16)
    First source unit line/station no.
    First source unit shot delay in milliseconds
        four digits 9,999 msec. max
    Second source unit line/station no.
    Second source unit shot delay
    .
    .
    Last source unit line/station no.
    Last source unit shot delay
File no. or record no. (Control Unit sequential, max = 999)
File multiplicity (stacking only)
    normalize or don't normalize after this sweep,
    sequential sweep no. in present series (up to 64 sweeps),
    Time zero delay in milliseconds:
        max. value = 9,999 msec; min. value = 100 msec
        (i.e., at end of this time-out all SGR's start recording)

A Reset Call is used to interrupt a series of VIBROSEIS Acquisition Calls, in which the seismic data collected are suspect and therefore to be discarded. The data may be "suspect" because a vibrator malfunctioned or the wrong acquisition parameters were set up in the Program Call, etc. The Reset Call clears the memory and "resets" the weighting and stacking functions. Thus, a new series of Acquisition Calls may begin immediately after a Reset Call (assuming that the original cause of the suspect data has been corrected). Note that a Reset Call is sent to the same groups of SGR's that the Acquisition Calls were being sent to.

The Test Call is transmitted to a single SGR immediately following a Program Call, to verify the line/station number assignments and to run a set of internal self-tests. Note that separate Test Calls are required for each channel being used. If any of the self-tests fail, one of several buzzer sequences will indicate the nature of the failure.

The following tests are run during a Test Call: EPROM Tests; Operating Program Tests; Buffer Memory Tests; APU Functions Tests; Data Acquisition Tests; Geophone String Tests; Bubble Memory Subsystem Tests; HSDL LoopBack Test; and Environment, Power Supply and Battery Voltages. Each of these tests is described below:

1. EPROM Tests—The EPROM in the SGR stores the "Boot Program" along with its resident calculated checksum. In this test, a new checksum is computed on the EPROM contents and compared against its stored checksum.

2. Operating Program Test—The operating memory stores the SGR operating program tests along with its resident calculated checksum. In this test, a new checksum is computed and compared to a checksum in EPROM.

3. Buffer Memory Tests—The first location (i.e., a single byte) of every 1K byte block of the 256K byte buffer memory will be used to first write and then read two predefined data patterns (hex 00 and then to FF).

4. APU Functions Test—Two predefined 8 sample-long traces are passed to the APU for stacking.

5. Geophone String Tests—Open, short, leakage and impulse tests are run on the geophone string connected to the channel under test.

6. Bubble Memory Subsystem Tests—A fixed pattern of data is written to the test track (1K bytes) of the bubble memory. The track is then read and the data compared to the original data for errors.

7. HSDL Loop-Back Test—A loop is formed electrically connecting the HSDL link driver output to the link receiver input inside the recorder. (No external connections are required.) The HSDL output and input are then simultaneously enabled, and test data is transmitted. The received data is then compared to the original data for errors.

8. Environment, Power Supply and Battery Voltage—Correct operation of the temperature and humidity sensing circuits is verified. The power supply output voltage levels, along with the battery voltage, are checked.

9. Data Acquisition Subsystem Test—Each input channel of the DAS is tested to detect faults in the geophone analog signal processing, including analog-to-digital conversions; notch filter; low cut filters, preamplifier and gain-ranging amplifier.

Unlike prior seismometer group recording systems which required manually collecting the tapes or the like from the recorder, seismic data accumulated in the solid state magnetic bubble memory subsystem of the adaptive SGR can be electronically downloaded via the high speed data link to a transcriber which formats the seismic data on a standard multi-track tape suitable for utilization with a main frame computer. As such, the electronic components of the SGR can be effectively sealed from its harsh operating environment so as to prolong its reliable operations.

From the foregoing, it will be understood that this invention provides an improved method and apparatus for seismic geophysical exploration. It will now be apparent to those skilled in the art that the foregoing disclosure and description of the invention is illustrative and explanatory thereof, and various changes may be made in the construction of the improved method and apparatus within the scope of the claims without departing from the spirit of the invention. Exemplary of such change that is clearly contemplated as falling within the scope of the claims would be to electronically download operating programs into the adaptive SGR of the present invention using coded signals transmitted by the remote control unit and received by the adaptive SGR's RF receiver.

What we claim is:

1. In a seismic exploration system, an adaptive seismometer group recorder having enhanced operating capabilities for acquiring, processing and storing seismic signals from at least one geophone, comprising:
   (a) a first solid state memory;
   (b) input means with the adaptive seismometer recorder for electronically downloading a plurality of operating programs providing menus of recorder operating parameters into the first solid state memory of the seismometer group recorder;
   (c) processing means with the seismometer. group recorder responsive to coded signals transmitted from a remote control unit for selecting sets of recorder operating parameters from the menus of recorder operating parameters provided by the operating programs to acquire and process the seismic signals; and
   (d) a second solid state memory for storing acquired and processed seismic data from the processing means.

2. The adaptive seismic recorder of claim 1 wherein said processing means comprises:
   (a) a microprocessor;
   (b) a RF receiver in communication with the microprocessor; and
   (c) electronically programmable memory in communication with the microprocessor having operating programs contained therein for use by the microprocessor to evaluate the coded signals received by the RF receiver.

3. The seismometer group recorder of claim 2 wherein said electronically programmable memory includes nonvolatile memory.

4. The seismometer group recorder of claim 2 wherein said electronically programmable memory includes volatile memory.

5. The seismometer group recorder of claim 1 further including output means with the adaptive seismometer group recorder for electronically transferring the seismic signals stored in the second solid state memory to a transcriber processing unit.

6. The seismometer group recorder of claim 1 wherein the first and second solid state memory comprises a magnetic bubble memory subsystem.

7. The seismometer group recorder of claim 1 further including verification means to verify operating programs electronically downloaded into the seismometer group recorder for completeness and accuracy.

8. The seismometer group recorder of claim 5 wherein said input means and output means comprise:
a high speed data transceiver responsive to coded signals from the processing means for electronically downloading operating programs into the first solid state memory and for electronically transferring seismic signals stored in the second solid state memory to the transcriber unit.

9. The seismometer group recorder of claim 1 wherein the menus of recorder operating parameters provided by the operating programs are selected from the group comprising:
(a) acquisition parameters;
(b) recorder operating instructions;
(c) seismic signal processing instructions; and
(d) diagnostic instructions.

10. The seismometer group recorder of claim 9 wherein said acquisition parameters include seismic signal sampling rate, notch filter selection, low-cut filter frequency selection, preamplifer gain, and external gain.

11. The seismometer group recorder of claim 9 wherein said recorder operating instructions include the frequency of the coded signal to which said processing means responds.

12. The seismometer group recorder of claim 9 wherein said processing instructions include weighting and stacking algorithms and window lengths for processing the seismic signals.

13. The seismometer group recorded claim 1 wherein said first and second solid state memory comprise high capacity, battery backed up CMOS DRAM memory.

14. A method of seismic exploration for acquiring, processing and storing seismic signals with an adaptive seismometer group recorder deployed in a region of exploration interest comprising the steps of:
(a) transmitting a first coded signal from a remote unit to the seismometer group recorder to select a first set of recorder operating parameters from a first menu of recorder operating parameters provided by first operating programs resident therein;
(b) acquiring and processing seismic signals generated by at least one geophone electrically coupled to each seismometer group recorder in accordance with the selected first set of recorder operating parameters;
(c) electronically downloading into the seismometer group recorder second operating programs providing a second menu of seismic recorder operating parameters;
(d) transmitting a second coded signal to the seismometer group recorder to select a second set of recorder operating parameters from the second menu of seismic recorder operating parameters provided by the second operating programs resident therein; and
(e) acquiring and processing the seismic signals in the seismometer group recorder in accordance with the selected second set of seismic recorder operating parameters.

15. The method of claim 14 wherein the first and second menus of recorder operating parameters provided by the first and second operating programs can include:
(a) acquisition parameters;
(b) recorder operating instructions;
(c) seismic signal processing instructions; and
(d) diagnostic instructions.

16. The method of claim 14 further including:
(a) storing a plurality of seismic signals acquired and processed in accordance with the selected recorder operating parameters in a solid state memory of the seismometer group recorder;
(b) retrieving the seismometer group recorder to a central location; and
(c) electronically coupling the retrieved seismometer group recorder to a transcriber unit for electronically transferring thereto the plurality of seismic signals stored in a solid state memory.

17. In a seismic exploration system, an adaptive seismometer group recorder having enhanced operating capabilities for acquiring, processing and storing seismic signals generated from at least one geophone electrically coupled thereto in response to seismic energy imparted into the earth, comprising:
(a) control means for transmitting coded signals to the seismometer group recorder to select a set of recorder operating parameters for acquiring, processing and storing seismic signals therein;
(b) processing means with the seismometer group recorder responsive to the transmitted coded signals for configuring the seismometer group recorder to acquire, process and store seismic signals in accordance with selected recorder operating parameters by selecting the recorder operating parameters from a menu of recorder operating parameters resident in the seismometer group recorder; and
(c) means for electronically downloading additional operating programs, providing additional menus of recorder operating parameters, into the seismometer group recorder, such that the processing means responsive to code signals transmitted by the control means can reconfigure the seismometer group recorder to acquire, process and store seismic signals in accordance with the recorder operating parameters selected from additional menus of recorder operating parameters provided by the additional operating programs electronically downloaded into the seismometer group recorder.

18. In the system of claim 17 further including verification means with seismometer group recorder for verifying the accuracy and completeness of the electronically downloaded additional operating programs.

19. A method of seismic exploration for acquiring, processing and storing seismic signals with an adaptive seismometer group recorder comprising the steps of:
(a) electronically downloading operating programs providing menus of recorder operating parameters into the adaptive seismometer group recorder;
(b) transmitting first coded signals to the seismometer group recorder to select a first set of recorder operating parameters from the first menu of recorder operating parameters to acquire, process and store seismic signals generated by at least one geophone electrically coupled to the seismometer group recorder; and
(c) transmitting second coded signals to select a second set of recorder operating parameters from the first menu of recorder operating parameters to acquire, process and store seismic signals generated by at least one geophone electrically coupled to the seismometer group recorder.

20. The method of claim 19 further including the steps of:
(a) transmitting third coded signals to the seismometer group recorder to select a first set of diagnostic tests from the menu of recorder operating parameters to check the functionality of the seismometer group recorder; and
(b) transmitting fourth coded signals to the seismometer group recorder to select a second set of diagnostic tests from the menu of recorder operating parameters to check the functionality of the seismometer group recorder.

21. The method of claim 17 further including the step of electronically downloading second operating programs providing second menus of recorder operating parameters into the adaptive seismometer group recorder.

22. The method of claim 17 further including:
(a) assigning the seismometer group recorder a field location identifier with the first coded signal; and
(b) transmitting a third coded signal to the seismometer group recorders to verify the field location identifier.

23. The method of claim 21 further including transmitting a third coded signal to select diagnostic tests from the menu of recorder operating parameters to verify functionality of the seismometer group recorder.

24. A method of seismic exploration with an adaptive seismometer group recorder and a remote control unit comprising the steps of:
(a) electronically downloading operating programs providing means of recorder operating parameters into the seismometer group recorder;
(b) programming each seismometer group recorder to respond only to coded signals transmitted from the remote control unit containing its unique individual serial indentification code;
(c) transmitting a program call to the seismometer group recorder to assign a field location identifier and to select an initial set of recorder operating parameters from the menu of recorder operating parameters;
(d) transmitting a test call from the remote control unit to the seismometer group recorder to verify the field location identifier assignment and initiate diagnostic tests of the seismometer group recorder; and
(e) transmitting an acqustion call from the remote control unit to the seismomemter group recorder to activate the seismometer group recorder to acquire, process and store seismic data in accordance with the selected recorder operating parameters.

25. The method of claim 24 further including:
(a) retrieving the seismometer group recorder to a central location and electronically coupling them to a tanscriber unit; and
(b) electronically transferring the stored seismic signals to the transcriber unit.

* * * * *